United States Patent
Lopian

(10) Patent No.: US 8,352,923 B2
(45) Date of Patent: Jan. 8, 2013

(54) METHOD AND SYSTEM FOR ISOLATING SOFTWARE COMPONENTS

(75) Inventor: Eli Lopian, Tel Aviv (IL)

(73) Assignee: Typemock Ltd., Tel Aviv (IL)

(*) Notice: Subject to any disclaimer, the term of this patent is extended or adjusted under 35 U.S.C. 154(b) by 580 days.

(21) Appl. No.: 12/442,948

(22) PCT Filed: Sep. 20, 2007

(86) PCT No.: PCT/IL2007/001152
§ 371 (c)(1),
(2), (4) Date: Mar. 25, 2009

(87) PCT Pub. No.: WO2008/038265
PCT Pub. Date: Apr. 3, 2008

(65) Prior Publication Data
US 2010/0037100 A1   Feb. 11, 2010

Related U.S. Application Data

(60) Provisional application No. 60/826,749, filed on Sep. 25, 2006.

(51) Int. Cl.
*G06F 9/44* (2006.01)
*G06F 9/45* (2006.01)

(52) U.S. Cl. ........ 717/135; 717/126; 717/127; 717/130; 717/131; 717/158; 703/22

(58) Field of Classification Search ............. 717/135
See application file for complete search history.

(56) References Cited

U.S. PATENT DOCUMENTS

| 4,819,233 | A  | 4/1989  | Delucia et al.    |
|-----------|----|---------|-------------------|
| 6,263,491 | B1 | 7/2001  | Hunt              |
| 6,484,276 | B1 | 11/2002 | Singh et al.      |
| 6,622,299 | B1 | 9/2003  | Santosuosso et al.|
| 2005/0039171 | A1 | 2/2005 | Avakian et al.    |

OTHER PUBLICATIONS

Steve Freeman, Tim Mackinnon, Nat Pryce, and Joe Walnes. 2004. Mock roles, not objects. In Companion to the 19th annual ACM SIGPLAN conference on Object-oriented programming systems, languages, and applications (OOPSLA '04). ACM, New York, NY, USA, 236-246. DOI=10.1145/1028664.1028765 http://doi.acm.org/10.1145/1028664.1028765.*
International Search Report for International Application No. PCT/IL07/01152 mailed Aug. 6, 2008.

* cited by examiner

*Primary Examiner* — James D Rutten
(74) *Attorney, Agent, or Firm* — Vladimir Sherman; Professional Patent Solutions

(57) ABSTRACT

Disclosed is a software testing system operative to test a software application, for example during runtime. There may be provided an apparatus for at least partially isolating, from within the software application, at least one highly coupled software component which performs a given function. Isolation may be performed by introducing, prior to execution, code elements for runtime access of application points associated with the at least one highly coupled software component. There may also be provided apparatus for removing or replacing a behavior of at least said at least partially isolated highly coupled software component during runtime.

52 Claims, 7 Drawing Sheets

| Method | Ease of implementation | Manual steps | Pros | Cons |
|---|---|---|---|---|
| Change Executable on disk | Easy to implement, via post compilation | Have to choose each file separately. Have to run a post compilation step | Ease of implementation | Many Manual steps. Will lead to tests not working because of configuration. |
| System IO Hooks | Extremely hard | Register the hook | One manual step | Fragile as changes to internal structures will effect the code. Requires elevated user to register the hook |
| Function hooking | NA | | | |
| Class Loader | NA | | | |
| Debug API | Quite Hard | Compile in Debug, run a process to attach to the test process | One manual step | Needs to be compiled in debug, slow |
| Profiler API | Quite Hard | Register the Profiler | One manual Step | Only one profiler can be used, this will disable some code coverage tools that use the API |

FIG. 2

METHOD AND SYSTEM FOR ISOLATING SOFTWARE COMPONENTS

CROSS-REFERENCE TO RELATED APPLICATIONS

This application is a National Phase Application of PCT International Application No. PCT/IL2007/001152, entitled "METHOD AND SYSTEM FOR ISOLATING SOFTWARE COMPONENTS", International Filing Date Sep. 20, 2007, published on Apr. 3, 2008 as International Publication No. WO 2008/038265, which in turn claims priority from U.S. Provisional Patent Application No. 60/826,749, filed Sep. 25, 2006.

FIELD OF THE INVENTION

The present invention relates generally to validating software.

BACKGROUND OF THE INVENTION

Conventional Internet sources state that "Dependency Injection describes the situation where one object uses a second object to provide a particular capacity. For example, being passed a database connection as an argument to the constructor instead of creating one internally. The term "Dependency injection" is a misnomer, since it is not a dependency that is injected, rather it is a provider of some capability or resource that is injected."

Validating software is a complex problem that grows exponentially as the complexity of the software grows. Even a small mistake in the software can cause a large financial cost. In order to cut down on these costs, software companies test each software component as they are developed or during interim stages of development.

The disclosures of all publications and patent documents mentioned in the specification, and of the publications and patent documents cited therein directly or indirectly, are hereby incorporated by reference.

SUMMARY OF THE INVENTION

Certain embodiments of the present invention disclose a method that enables isolating software components, without changing the production code. Testing isolated software components gives better testing results as the coverage of the tests is much higher and the complexity does not grow exponentially. This is a basic requirement for validating a software component. In order to isolate the components, there is a need to design the program that utilizes the software components in such a way that the components can be changed. This is part of a pattern called Inversion of Control or Dependency Injection. For example when validating that software behaves correctly on the $29^{th}$ of February, there is a need to change the computer system's date before running the test. This is not always possible (due to security means) or wanted (it may disturb other applications). The method used today to verify this is by wrapping the system call to get the current date with a new class. This class may have the ability to return a fake date when required. This may allow injecting the fake date into the code being tested for, and enable validating the code under the required conditions. There are many cases where isolating the code base and injecting fake data are required. Here are a few examples:

1. Fake a behavior that is scarce. (Dates, Out of Memory)
2. Fake slow running components. (Database, Internet)
3. Fake components that are difficult to set up (send e-mail, ftp)

Other cases may require a more complex solution. When faking a complete set of API's (for example: faking sending an email) there is a need to build a framework that enables isolating the complete API set. This means that the code may now have to support creating and calling two different components. One way to do this is to use the Abstract Factory Pattern. Using this pattern, the production code should never create the object (that needs to be faked for tests). Instead of creating the object, the Factory is asked to create the object, and the code calls the methods of the object that the factory created. The factory can then choose what object to create: a real one or a fake one. This requires using an interface that both clients (real and fake) need to implement. It also requires creating a complex mechanism that may allow the factory to choose what object to create and how to do so. This is done mainly through configuration files although it can be done in code too.

When testing using fake objects, it is important to validate the arguments passed to the fake object. In this way it is possible to validate that an e-mail that is supposed to be sent has the correct subject and address. The e-mail, of course, is not actually sent. There is no need to validate that component again, as the e-mail tests are done in isolation for the e-mail object.

It is possible to write the fake object and methods by hand or to use a mock framework 110. A mock framework 110 may dynamically create a fake object that implements the same interface of the real object (the same interface that is created using the Abstract Factory), and has the ability to define the behavior of the object and to validate the arguments passed to the object.

Although these methods work and enable testing the code base, they also require that the code is designed to be testable. This cannot always be done, as sometimes the code is a legacy code, and should remain as such. Legacy code refers to any code that was not designed to allow insertions of fake objects. It would be too costly to rewrite them, as this may lead to an increase in development time just to make the code testable. The more complex the code the harder it is to maintain. Designing the code to be testable, puts constraints into the design that are not always compatible with the production design. For example, the code may be required to implement hooks that enable changing the actual object to a fake one. This hook can lead to misuse and hard-to-debug code, as it is intended for testing but it is in the production code.

It would be easier to test such code if there were no need to change the design for testability, but it should be able to isolate and fake the code required to validate such code. For example, it would be easier if the system could be programmed to fake the real e-mail object. There would then be no need to create an Abstract Factory or interfaces or hooks if the system could be configured not to make the real calls on the e-mail object, but to fake them. In order to solve this problem, certain embodiments of the invention add code that is inserted or weaved 107 into the production code base 106 (FIG. 1) that is being tested. The added code may enable hooking fake or mock objects into the production code by calling the Mock framework 110. This framework can decide to return a fake object. The framework may also be able to validate and change the arguments passed into the method.

Any suitable processor, display and input means may be used to process, display, store and accept information, including computer programs, in accordance with some or all of the teachings of the present invention, such as but not limited to a conventional personal computer processor, workstation or other programmable device or computer or electronic computing device, either general-purpose or specifically constructed, for processing; a display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention.

Any trademark occurring in the text or drawings is the property of its owner and occurs herein merely to explain or illustrate one example of how an embodiment of the invention may be implemented.

BRIEF DESCRIPTION OF THE DRAWINGS

Certain embodiments of the present invention are illustrated in the following drawings:

FIG. 2 is an example of a decision table for NET code, constructed and operative in accordance with certain embodiments of the present invention;

DETAILED DESCRIPTION OF CERTAIN EMBODIMENTS

Figure 1:
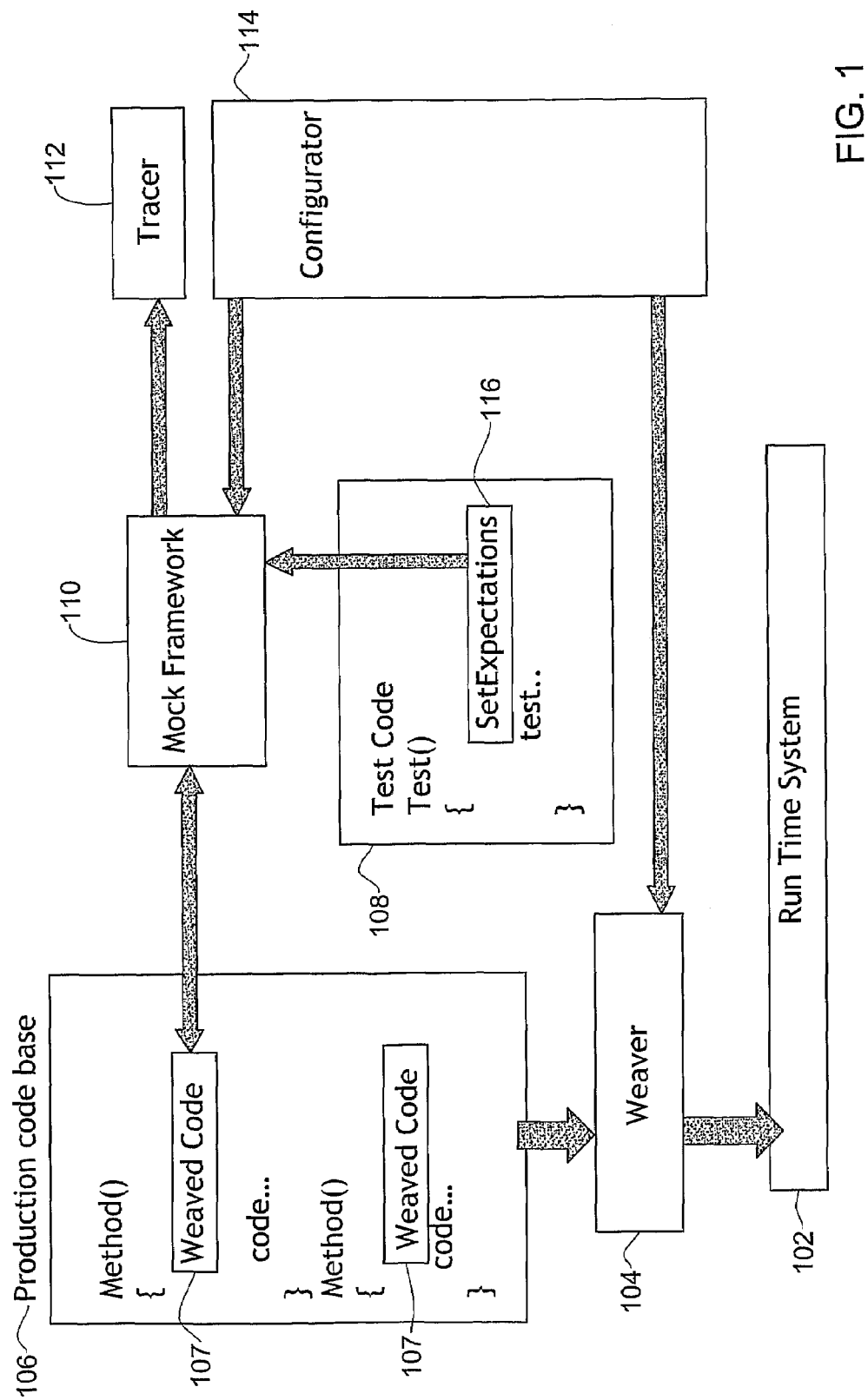
FIG. 1 is a simplified functional block diagram of a software isolation system constructed and operative in accordance with certain embodiments of the present invention.

Reference is now made to FIG. 1 which is a simplified functional block diagram of a software isolation system constructed and operative in accordance with certain embodiments of the present invention. The run time system 102 is the system that actually runs the code and the tests; this could be an operating system, a scripting system or a virtual machine (as in Java or .NET). The weaver 104 is responsible for inserting the added hooking code into the production code base 106. In each method of the production code the weaver 104 may insert a small piece of code 107 that calls the Mock framework 110 which then decides whether to call the original code or to fake the call. The inserted code 107 can also modify the arguments passed to the production method if required. This is handy for arguments passed by reference.

The production code base 106 is the code that is to be isolated. There is no need to change the design of this code just to isolate the code. The test code 108 calls the Mock framework 110 in order to change the behavior of the production code. Here the test can set up what to fake, how to validate the arguments that are passed, what to return instead of the original code and when to fail the test. The mock framework 110 is responsible for creating mock objects dynamically and for managing the expectations and behavior of all fake calls. The tracer 112 is typically used to debug and graphically display the methods that are mocked. It is typically used to analyze the faked and original calls of the production code. The configurator 114 is used to set the options of the tool.

There are several ways in which it is possible to insert code 107 into production code 106 such as but not limited to the following:
(a) Change the executable on disk before running the tests,
(b) Use System IO Hooks to change the executable just before reading it from the disk,
(c) Use function hooking techniques,
(d) Use RunTime ClassLoader hooks to change the code before it is run, and
(e) Use Profiler and Debug API's to change the code 302 before it is loaded as indicated by arrow 306 in FIGS. 3-4.
Each method has its pros and cons. The main decision factors are Ease of implementation and Manual vs Automatic as selected by the user.

Figure 3:
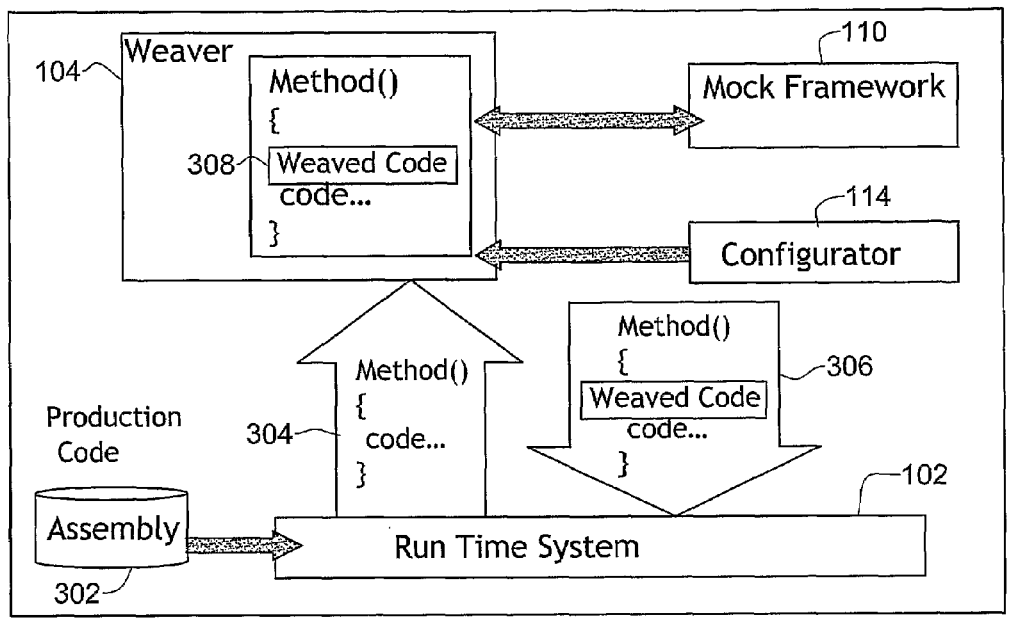
FIG. 3 is a simplified flowchart illustration for the weaver of FIG. 1, constructed and operative in accordance with certain embodiments of the present invention.
Figure 4:
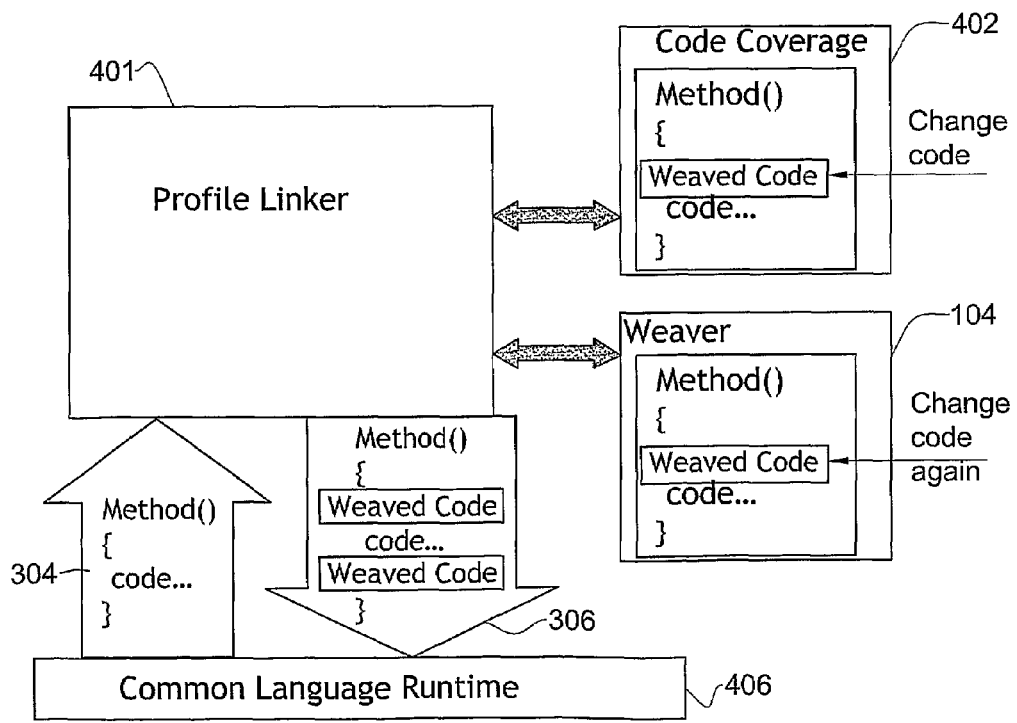
FIG. 4 is a simplified functional block diagram of a profile linker and associated components, constructed and operative in accordance with certain embodiments of the present invention.

FIG. 2 is an example of a decision table for .NET code. The method that was chosen was the Profiler API (FIG. 3). In order to solve the issues with the code coverage tool, a Profiler Linker was created. (FIG. 4)

Referring now to FIG. 3, the Weaver 104 registers to the NET Runtime (CLR) 102 and typically just before the JIT Compiler is run to create machine code 304 from the Byte code 302, instructions pertaining to the added hooking code are inserted as indicated at reference numeral 308. The Weaver 104 typically analyses the signature of the method in order to understand the parameters passed and the return value. This enables writing code that may call the Mock framework 110 to check if the method needs to be faked, and to pass the arguments to the Framework 110 for validating. The code also changes the values of the parameters if required. This is useful for parameters that are passed by reference and for swapping the values for the test (e.g. it is possible to change a filename that is passed as a parameter to point to a dummy file required for the test). The weaver 104 is actually a framework that can be used to insert any new code into a code base. The weaver 104 has to change the metadata and add information that points to the correct Mock framework 110. This is typically done by putting the framework 110 in a known directory (GAC) and by parsing the assembly (dll file) to extract relevant information (version and signing signature). Some information is passed from the Mock framework 110 to the Weaver 104, this is typically done using environment variables, although there are other methods available to do this. According to certain embodiments of the present invention, one, some or all of the following may hold:

1. The weaver 104 must run well in debug mode too and thus it is required to fix the debug to code mapping to ignore the code that is added.
2. Try catch handlers must also be updated to point to the correct positions in the code after the code has been added.
3. The weaver 104 must take into consideration small and large method headers and event handlers.
4. Creating new code must take place when the assembly is first loaded.
5. Signed assemblies can only call other signed assemblies so the Mock framework 110 is signed.
6. In order to support multiple .NET versions the same Weaver 104 is used and has instructions that enable it to use features of the later version only when that version is available.
7. The Mock framework 110 assembly should not be weaved as this may lead to a recursive infinite loop.

Weaving via the MetaData is now described with reference to FIG. 3.

Another method to isolate code and to insert fake objects is by changing the metadata tables. Each call to a method is defined as 'call <entry in method table>'. Each entry in the method table has the name of the method its type (which is actually an <entry in the type table>) and other information. Each entry in the type table has the name of the type and the assembly that it is defined in (which is an <entry in the assembly table>). By switching these entries, for example the assembly of the <type> and its <name> all calls to a method can be redirected to a mocked object. Although this method requires building the mock object and handling delegating calls back to the original object, it has the advantage of being less intrusive as it does not change the production code, but only the metadata tables. This is useful in cases where the Run time system 102 has restrictions on the code being inserted.

An embodiment of the Profiler Linker 401 is now described with reference to FIG. 4. In order to support profiling and code coverage tools that may be required to run together with the tests, a profile linker may be employed. The profile linker 401 loads one or more profile assemblies (COM objects that are suitable to be a profiler) and then calls each profiler sequentially and weaves code from both the assemblies. The profiler linker 401 takes care of profilers from different versions and manages to make sure that the profilers work correctly. According to certain embodiments of the present invention, in order to have the ability to debug the code, there is a need to map the actual code with the source file. When code is added, the map needs to be fixed, and/or the linker 401 changes the code of both assemblies.

Figure 5:
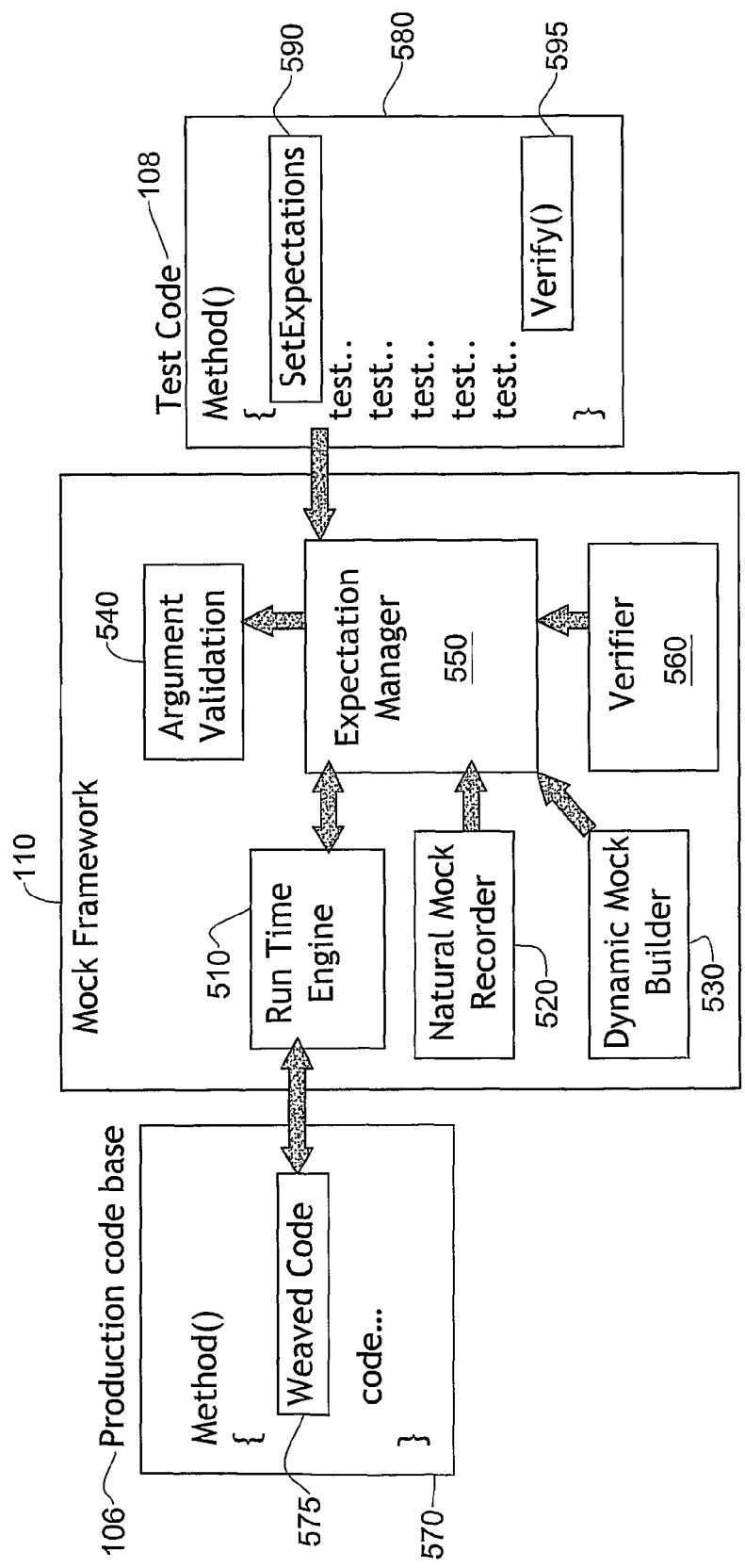
FIG. 5 is a simplified functional block diagram of the mock framework of FIG. 5 and associated components, all constructed and operative in accordance with certain embodiments of the present invention.
Figure 6:
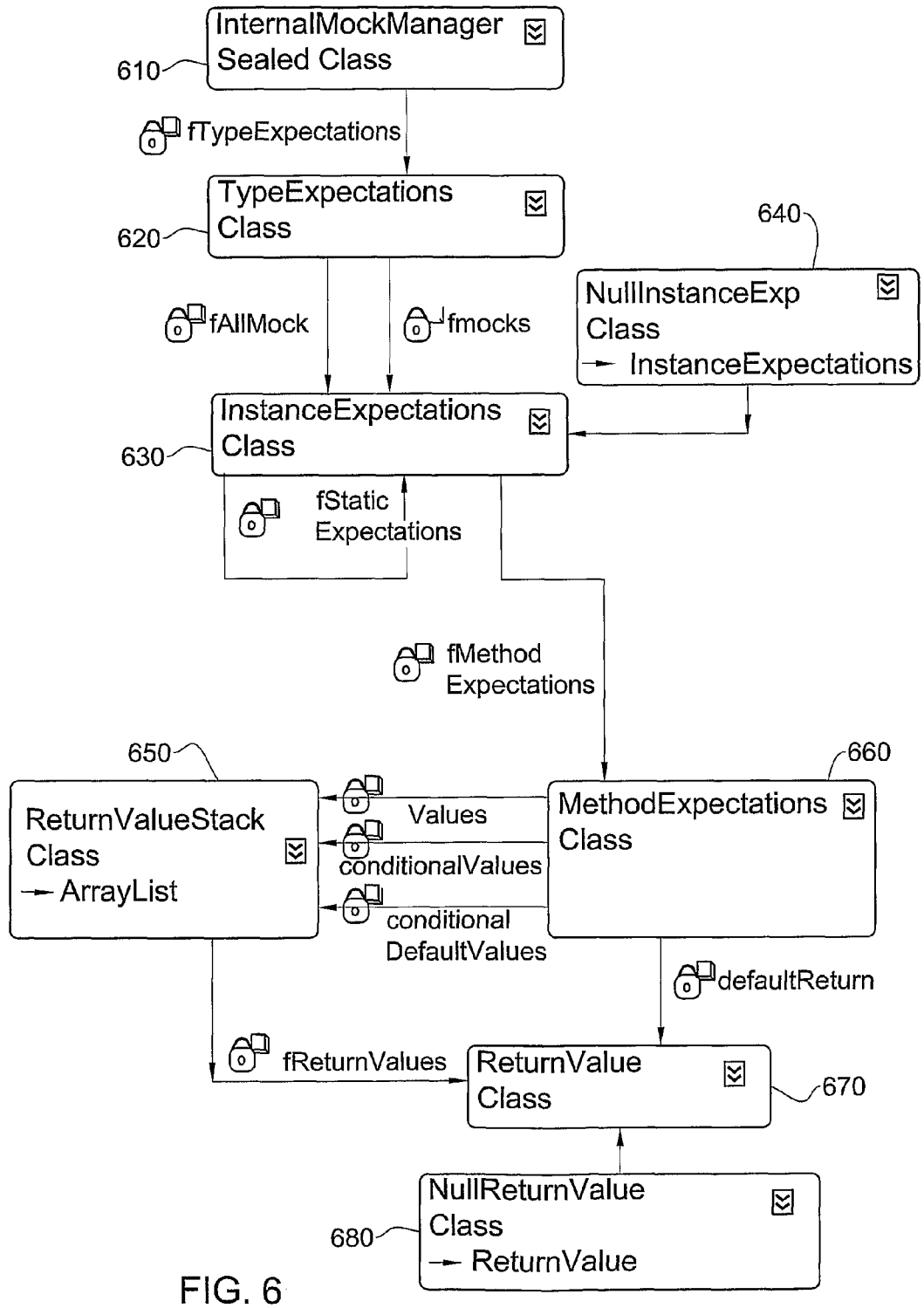
FIG. 6 is a simplified flow diagram of expectations used by the expectation manager of FIG. 5, in accordance with certain embodiments of the present invention.

An embodiment of the Mock Framework 110 is now described with reference to FIGS. 5 and 6. The mock framework 110 is in charge of managing the expectations. This framework is linked by the test code 108, and expectations are recorded using the frameworks API. The mock framework 110, as shown in FIG. 5, typically comprises an Expectation Manager 550, a Natural Mock Recorder 520, a Dynamic Mock Builder 530, an Argument Validation 540, a Run Time Engine 510 and a Verifier 560.

The Expectation Manager 550 is a module used to manage the expectations for the fake code. The expectations may be kept in the following way, which is not the only way do to this, but it has its advantages. The Framework 110 holds a map of type expectations 620 that are indexed via the type name. Each Type Expectation is connected to a list of Instance Expectations 630 indexed by the instance and another reference to an Instance Expectation that represents the expectations for all instances.

All Instance Expectations of the same type reference an Instance Expectation that manages the expectations for all static methods. This is because static methods have no instance. Each Instance Expectation contains a map of Method Expectations 660 that is indexed via the method name. Each method may have the following four lists as shown in FIG. 6:

1. a default Return Value representing a value to return by default
2. a queue of return values that should be faked
3. a queue of conditional values that are used only when the arguments match
4. a queue of conditional default values are used only when the arguments match The Method Expectation 660 may first check for a conditional value then a default conditional value, then a regular value and finally the default value. The Null Return Value 680 and Null Instance Expectation 640 are classes that are part of the Null Object pattern. This leads to faster code while running, as there is no need to check if references to Return Value or Instance Expectation are null. Expectations of Generic types are managed each in its own Type Expectation class with the generic parameters as a key, although the non generic Type Expectation points to the generic one. Expectations of Generic methods are managed each in its own Method Expectation class with the generic parameters as a key, although the non generic Method Expectation points to the generic one.

Two ways to set expectations, namely by the use of Reflective mocks or Natural Mocks, are now described.

a. Reflective mocks use strings names of the methods that are to be mocked. The Framework analyzes the tested assembly, searches for the method and checks that it exists and has the correct return value. The method is then added to the expectations of that method. The test code 108 can then change the behavior of the code and registers what that method should do and how many times. The method may be instructed to return a fake result, throw an exception, or call the original code. The framework may also be instructed to always fake a method (this is the default return), or to fake the next call or number of calls (managed by the Return Value Stack).

There are also hooks to call user supplied code when the method is called. As some methods are instance methods, there are ways to tell the Framework what instance to mock. For example, the Framework can be directed to mock all instances, a future instance or to create the mocked instance so that it can be passed to the production code 106 (this may be managed by the Type Expectation). Methods can also have conditional expectations. Conditional expectations may fake calls only if the arguments passed are the same as those expected. The framework allows expectations to be canceled and changed before the actual code is called.

b. Natural Mocks use the actual calls to the methods that are to be mocked. The Framework may be called by these calls (because all the methods are already weaved) and the framework may record that the call is expected, and add it to the list of expectations. The framework allows setting the behavior in the same way as Reflective Mocks. Chained calls are also supported using Natural Mocks. This allows a chain of calls to be mocked in one statement. The Framework may build the return object of one statement in the chain as an input for the next statement in the chain. Of course the framework has to differentiate between creating Dynamic Mocks for incomplete types and real objects with dummy constructor arguments for complete or static objects.

Using Natural Mocks is easier than Reflective Mocks and they are supported by IDE editors that allow code completion and automatic re-factoring, but these cannot account for all cases. Re-Factoring is the process of restructuring code without changing its behavior. There are development tools that help to automate this task. When a method cannot be called from the code (for example if its scope is private), Reflective Mocks must be used. Although Reflective Mocks have the advantage of covering all scopes of the methods, they are more prone to mistakes as the methods are passed as a string.

Figure 7:
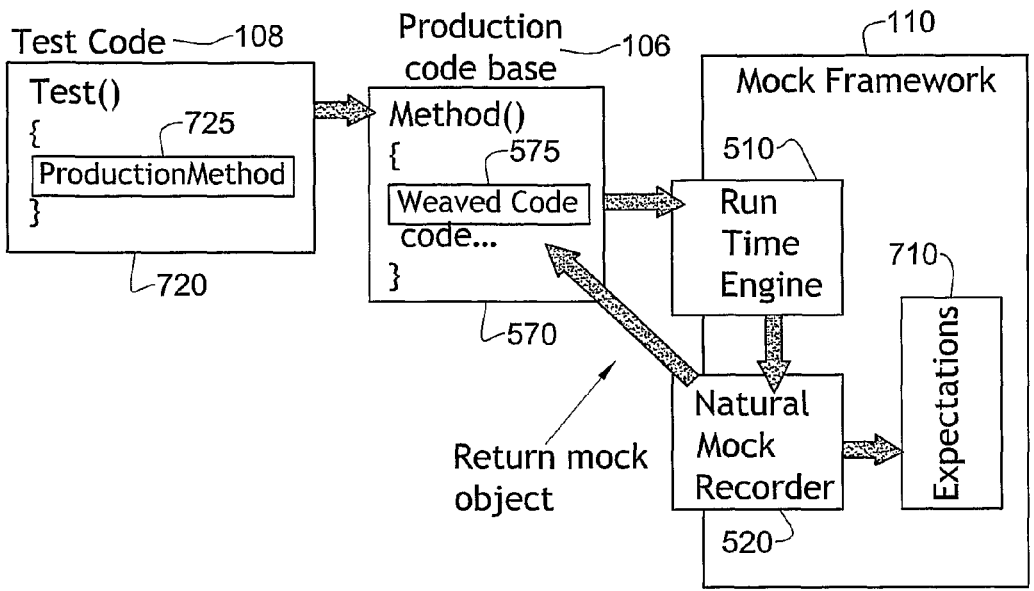
FIG. 7 is a simplified flow diagram of a natural mock setting embodiment of the present invention.

FIG. 7 is a data flow diagram showing a Natural Mock Setting Expectations Flow according to an embodiment of the present invention.

The Dynamic Mock Builder 530 is used to create new objects in a dynamic assembly. This creates real objects out of incomplete classes (with abstract methods or interfaces). These objects can then be used and passed to the production code, so that when methods are called the Run Time Engine 510 may return fake results to the created methods. These objects are built using the standard Reflection library.

The Argument Validation 540 is responsible for verifying that the arguments passed are those that were expected. This is done using a hook that actually does the validation. The Arguments passed and those expected are sent to a validation method that checks different attributes of the object. The attributes, which may be of virtually unlimited scope, may, for example, indicate that the objects are the same or that the .Equals( ) method is true. The framework 110 has a predefined group of argument validators including string comparisons, Group and Sets comparisons, which verify that the object is being faked by the framework. The test code 108 can register a customized validator if this is required.

When Natural Mocks are used, the arguments passed to the recording method are used to validate the arguments, unless explicitly overridden. The framework 110 also allows setting arguments of the mocked methods. This actually changes the values of the arguments before the actual code is called. This is useful for arguments that are passed by reference, so that their values can be changed before they are returned and fake [out] arguments.

The run time engine 510 is called from the code weaved into the production code. The Run Time engine 510 checks to see if the specific type, instance and method should be faked. If they are, the code may validate the arguments and return the fake return value. The Run Time Engine 510 checks the arguments to see if a conditional expectation should be used. The engine also calls the argument validation, and when the arguments are not valid the engine may throw an expectation. There are cases where throwing the expectation is not enough and, when configured correctly, these validation errors may appear at the verifying stage too.

Figure 8:
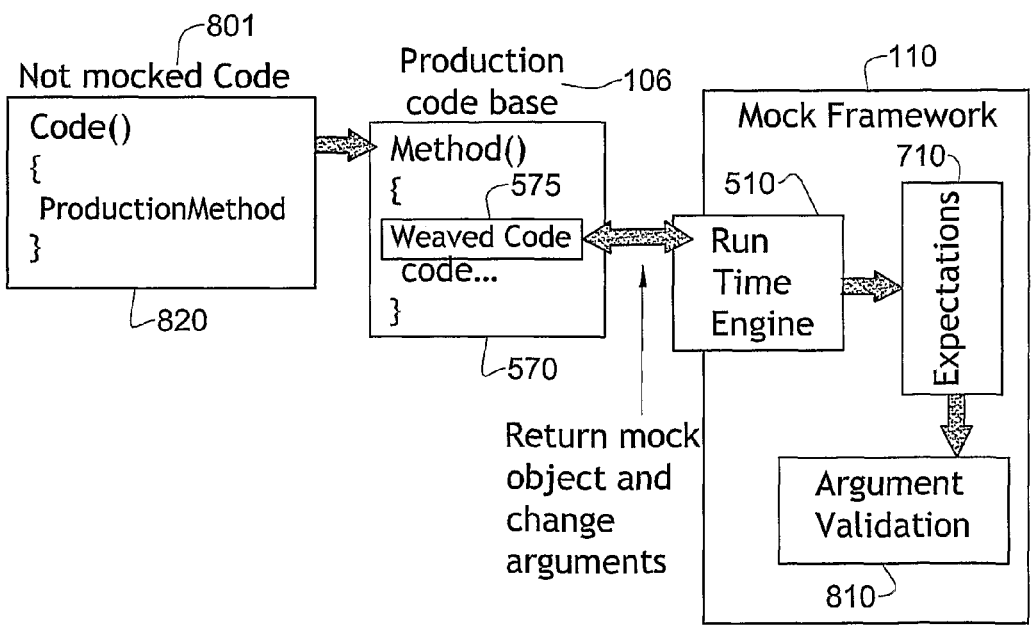
FIG. 8 is a simplified flow diagram of a mocked method flow which may be performed by the apparatus of FIG. 1, in accordance with certain embodiments of the present invention.

Performance is an issue for the Run Time engine 510 as it is run for every method called. One way to solve this is to check if the method is faked; this returns quickly if no mocks have been created or if the type is not mocked. Only after knowing that the method is mocked, are the arguments passed and validated, since passing the argument can take time as they are all required to be encapsulated within an object. When Natural Mocks are used the Run Time Engine 510 passes each call to the Natural Mock Recorder. A flow diagram of the Mocked Method Flow described herein is shown in FIG. 8.

In order for the runtime engine 510 to map the called code to the correct mock expectation the Engine 510 may employ the type, method, instance and type generic and method generic parameters. The last two are for generic specific code only and with them it is possible to map the correct expectations. The engine receives this information from the weaver 104 that analyzed the metadata of the code. When a new instance is created and its constructor is called, the Run Time Engine 510 checks if expectations contain mocks for the new instance. This way the Engine can manage mocking objects that are created after the expectations are set (Future Objects).

A static constructor is called once for each type. When a static constructor is called, the Run Time Engine 510 remembers that this was mocked. Then when a method of that type is called and the type is not mocked any more, the static constructor may be called. This ensures that mocking the static constructor in one test will not affect another test.

The verifier is called at the end of the test and throws errors when not all the expected calls are made or when an argument validator fails. The verifier can wait till all expected mocks are completed. This is a feature that helps test multi-threaded code, where the tested code runs asynchronically in another thread.

In certain embodiments of the invention, the framework must run in all NET versions and uses reflection methods to call the newer version API from the old version. Re the Production code base 106, nothing has to change here. The test code 108 calls the Mock Framework API in order to change the behavior of the production code. The tracer 112 is used to debug and graphically display the methods that are mocked. It is used to analyze the faked and original calls of the production code. Mocking of future objects can be a bit confusing, and the tracer 112 helps track these issues.

Figure 9:
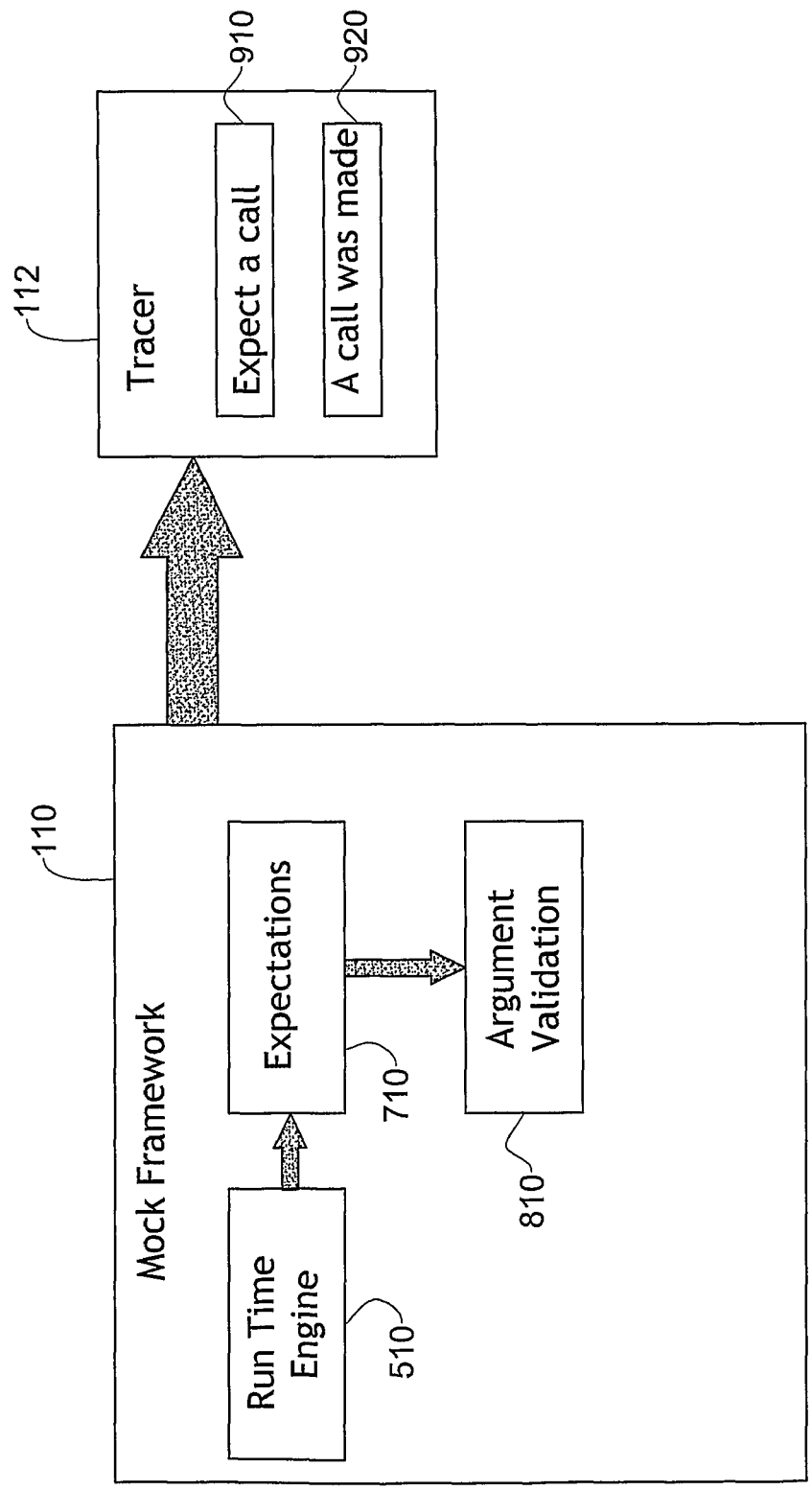
FIG. 9 is a simplified diagram of a method by which the mock framework of FIG. 1 sends messages to the tracer of FIG. 1, all in accordance with certain embodiments of the present invention.

FIG. 9 show the Mock framework 110 sending messages to the tracer 112 process.

The configurator 114 is used to configure the behavior of the Framework 110. Using the Configurator 114 it is possible to link a code coverage tool with the mock framework 110. This may be done by changing the registry key of the coverage tool to point to the Profile Linker 401. The Linker 401 then loads both the coverage tool and the mock framework 110.

Advantages of certain embodiments of the present invention include that it is much easier to verify the code base of an application. There is no need to perform pre-compile steps, or to create special designed code to be able to isolate the code in order for the code to be testable. For example, suppose a developer had the following production code: Dogs.GetDog ("rusty").Tail.Wag( ).Speed(5);

This actually fetches the dog from somewhere in the Internet. Instead of changing the code to be able to insert a fake dog and setting all the expectations on the different methods, using certain embodiments of the invention may enable the code to be isolated by writing:

```
MockTheFollowing( );
Dogs.GetDog("rusty").Tail.Wag( ).Speed(5);
CheckArguments( );
EndMocking( );
```

In contrast, in the absence of the present invention, the following may have been required:
1. Write a framework allowing Dogs to fetch from a fake Internet.
2. Create a fake Internet
3. Set Dogs to use the fake Internet
4. Return a fake Dog when "rusty" is called
5. Return a fake Tail of "rusty"
6. Make sure that the tail is wagging
7. Make sure that the wag was set to correct speed.

The test code 108 would look like this (the production code changes are not shown):

```
FakeDogInternet fakeInternet = new FakeDogInternet( );
Dogs.SetInternet(fakeInternet);
FakeDog fakeDog= new FakeDog( );
fakeInternet.ExpectCall("GetDog");
CheckArguments("rusty");
Return(fakeDog);
FakeTail fakeTail = new FakeTail( );
fakeDog.ExpectGetProperty("Tail");
Return(fakeTail);
FakeWagger fakeWagger = new FakeWagger( );
fakeTail.ExpectCall("Wag").Return(fakeWagger);
fakeWagger.ExpectCall("Speed");
CheckArguments(5);
```

The following interfaces would need to be created:
1. IDogInternet
2. IDog
3. ITail
4. IWagger The following implementation would need to be created (this can be done with a dynamic mock framework 110):
1. FakeDogInternet
2. FakeDog
3. FakeTail
4. FakeWagger The following public method may be in the production code: Dogs.SetInternet( ). An implementation of an embodiment of the invention for .NET code is now described. Provided is the following static method that returns the current time.

Original Code

```
public static DateTime get_Now( )
{
    // This is just an example..
    return System.DateTicks.ToLocalTime( );
}
```

This is actually compiled to the following ByteCode:

```
call System::get_DateTicks ( )
stloc.0
ldloca.s time1
call instance DateTime::ToLocalTime( )
ret
```

Before the ByteCode is run the weaver 104 may add code to the ByteCode that mimics the following code may be added to the original code, it being emphasized that the weaver 104 adds code to directly to the ByteCode, the original code being unaffected. The equivalent high level language is shown for clarity:

```
public static DateTime get_Now( )
{
    // Are we mocked?
    if (MockFramework.isMocked("DateTime.get_Now"))
    {
        // Yes, get the fake return value
        object fakeReturn =
            MockFramework.getReturn("DateTime.get_Now");
        // should we Continue with original code?
        if (!MockFramework.shouldCallOriginal(mockReturn))
        {
            return (DateTime)fakeReturn;
        }
    }
    return System.DateTicks.ToLocalTime( );
}
```

Actually add the following byte code may be added:

```
ldstr "DateTime.getNow"
call MockFramework.isMocked
brfalse.s label1
ldstr "DateTime.getNow"
call MockFramework.getReturn
dup
brtrue.s 0x07
unbox DateTime
Ildind.i1
ret
pop
label1: call System::get_DateTicks ( )
stloc.0
ldloca.s time1
call instance DateTime::ToLocalTime( )
ret
```

The stack may be used to keep the mocReturn object instead of a local variable. This saves the weaver 104 from defining the variable in the metadata. This helps to test the code. Now that this is in place it is possible to test that the code that counts the number of days in the current month works for also leap years. Following is an example of one test, showing the code to be tested:

```
// List of days in each month
int[ ] days_in_month = {31,28,31,30,31,30,31,31,30,31,30,31};
public int CalculateDayInCurrentMonth( )
{
    DateTime now = DateTime.Now;
    int month = now.get_Month( );
    return days_in_month[month];
}
```

Following this, the user wishes to test that it works for leap years. DateTime.Now is isolated and made to return a fake date, the leap year date. As the system can be isolated, the MockFramework can be instructed to return a fake date

```
DateTime leapDate = new DateTime("29-Feb-2004");
// Fake next DataTime.Now, will return 29-Feb-2004
MockFramework.Mock(DateTime.Now).ToReturn(leapDate);
// run the method under test
int actualDays = CalculateDayInCurrentMonth( );
// make sure that the correct amount was recived
Assert.AreEqual(29, actualDays);
```

Verifying Calls: The mechanism can be used to test that a certain call was actually made. In the previous test DateTime.Now might never even be called. As the Mock framework 110 counts the calls made, it can now be verified that the expected calls were actually made.

```
// fail if we haven't called all expectations
MockFramework.VerifyThatAllExpectedCallsWhereMade( );
```

Verifying Arguments: Some scenarios require that the arguments that are passed are validated. To support this, the arguments to the MockFramework must be sent for verifying. Given Original Code:

```
public static void Log(int severity,string message){
    Console.WriteLine(severity.ToString( )+" "+message);
}
``` the Weaved code 107 may be:

```
public static void Log(int severity,string message)
{
    if (MockFramework.isMocked("DateTime.IsSame"))
    {
        // Yes, get the fake return value and validate the
        arguments
        object fakeReturn =
        MockFramework.getReturn("DateTime.IsSame",
            severity, message);
        // should we Continue with original code?
        if (!MockFramework.shouldCallOriginal(mockReturn))
        {
            return;
        }
    }
    Console.WriteLine(severity.ToString( )+" "+message);
}
```

This helps to test the code. Now that this is in place it is possible to test that our code Logs the correct message. Following is an example of one test.

```
// Fake next Log,
MockFramework.Mock(Logger.Log(1,"An Error message")).
    ToReturn(leapDate).CheckArguments( );
// run the method under test
RunAMethodThatCallsLog ( );
// we will fail if Log is called with other arguments
```

Ref and Out Arguments: Some arguments are changed by the method and are passed back to the caller. The following shows how the code is weaved.

Given Original Code:

```
public static bool OpenFile(string fileName, out File file){
    file = new File (fileName);
    return file.Open( );
}
``` the Weaved code 107 may be:

```
public bool OpenFile(string fileName, out File file)
{
    if (MockFramework.isMocked("IO.OpenFile"))
    {
        // Yes, get the fake return value and validate the arguments
        object fakeReturn = MockFramework.getReturn("IO.OpenFile",
            fileName, file);
        // fake first arg
        if (MockFramework.shouldChangeArgument(1))
        {
            fileName = (string)MockFramework.getArgument(1);
        }
        // fake 2nd arg
        if (MockFramework. shouldChangeArgument(2))
        {
            file = (File)MockFramework.getArgument(2);
        }
        // should we Continue with original code?
        if (!MockFramework.shouldCallOriginal(mockReturn))
        {
            return (bool) fakeReturn;
        }
    }
    Console.WriteLine(severity.ToString( )+" "+message);
}
```

This helps to test the code. It is now possible to isolate the OpenFile. Following is an example of one test:

```
// Fake next OpenFile and open a test File,
File testFile = new File("testExample");
MockFramework.Mock(IO.OpenFile("realfile", out testFile)).
    ToReturn (true).CheckArguments( );
}
// run the method under test
RunAMethodReadsTheFile ( );
// we will read the fake file and not the real file, but fail if the real file
was not passed
```

Modern languages support the notation of Generics. Using Generics allows the same logic to run with different types. A Stack is a classic example. In order to support mocking, only certain types of generic code, information about the generic parameters must be passed to the Mock framework 110. There may be two kinds of generic parameters: Type Generic—these are types that stay the same for all methods; and Method Generics—these are types that stay the same for one method. These types are passed to the MockFramework.getReturn method.

The Original Code may be:

```
public static void DoSomething<MethodType>(MethodType
action,ClassType
message){
    action.Perform(message);
}
```

The Weaved code 107 may include:

```
public static void DoSomething<MethodType>(MethodType
action,ClassType message)
{
    if (MockFramework.isMocked("Namespace.DoSomething"))
    {
        Type typeGenerics = new Type[ ] { ClassType };
        Type methodGenerics = new Type[ ] { MethodType };
```

```
        // Yes, get the fake return value and validate the
        arguments
        object fakeReturn =
        MockFramework.getReturn("DateTime.IsSame",
               typeGenerics, methodGenerics,severity, message);
        // should we Continue with original code?
        if (!MockFramework.shouldCallOriginal(mockReturn))
        {
            return;
        }
    }
    action.Perform(message);
}
```

Suppose the user hasboth class Base with method Count( ) and also a class, Derived, that is derived from base. When calling the Derived.Count( ) method, the user is actually calling the Base.Count method. In order to be able to mock Count( ) only for the derived class, the user needs to know what the class of the method is. This is why the user passes a context with the actual instance to the Mock framework 110. The Weaved code 107 may now look like this:

```
public static int Count( )
{
    if (MockFramework.isMocked("Base.Count")
    {
        // pass this so we can tell if this is being called
        // from Base or Derived
        object fakeReturn = MockFramework.getReturn("Base.Count",
               this);
        // should we Continue with original code?
        if (!MockFramework.shouldCallOriginal(mockReturn))
        {
            return;
        }
    }
    action.Perform(message);
}
```

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A software testing system operative to test a software application comprising a plurality of software components, at least some of which are coupled in a utilizing-utilized relationship the system comprising:

a processor and memory:

computational apparatus for at least partially isolating, from within the software application, at least one coupled software component which performs a given function by introducing, prior to execution, code elements for runtime access of application points associated with the at least one coupled software component, wherein at least one code element associated with the at least one coupled software component provides access control between utilizing-utilized software components;

computational apparatus for testing the software application by imposing a fake behavior on the at least one coupled software component, wherein imposing includes removing or replacing an expected behavior of the at least one coupled software component during runtime; and wherein the at least one code element is operative to query said computational apparatus for testing.

2. A system according to claim 1 wherein said coupled software component is operative to call at least one additional software component and wherein said apparatus for testing is operative to test whether said at least partially isolated coupled software component calls said at least one additional software component correctly.

3. A system according to claim 1 wherein said set comprises at least one utilizing software component which calls its corresponding utilized software component.

4. A system according to claim 1 wherein said set comprises at least one utilizing software component which accesses at least one data element belonging to its corresponding utilized software component.

5. A system according to claim 1 wherein said utilizing software component comprises test code and wherein said access controlling code is operative to generate a plurality of testing scenarios for said test code by suitably controlling access of the test code to the utilized software component.

6. A system according to claim 1 wherein the software application comprises at least one source file and wherein said apparatus for adding code is operative, before compilation of the software application, to add the access controlling code to the at least one source file thereby to provide, upon compilation of the source file, an at least partially isolatable weaved application.

7. A system according to claim 1 wherein the software application is stored in at least one executable file and wherein said apparatus for adding code comprises apparatus for parsing said at least one executable file, adding said access controlling code to the parsed executable file, and saving, thereby to provide an at least partially isolatable weaved executable file.

8. A system according to claim 1 wherein said apparatus for adding code is operative, after the software application has been loaded into directly accessible memory by an operating system from an executable file on disk and before the software application has been run, to parse the software application and add said access controlling code to the parsed software application, thereby to provide an at least partially isolatable weaved application.

9. A system according to claim 1 wherein the plurality of software components comprises a set of at least one pairs of utilizing-utilized software components each including a utilized software component and a utilizing software component which utilizes said utilized software component, and wherein said apparatus for at least partially isolating comprises access controlling code external of the software application for anticipating forthcoming utilization of utilized software components by utilizing software components and for selectively preventing said utilization by controlling access of the utilizing software component to the utilized software component.

10. A system according to claim 1 wherein said apparatus for at least partially isolating is operative, upon occurrence of a call by a first component from among the plurality of software components to a second component from among the plurality of software components, to intervene to ensure mat the second component does not run.

11. A system according to claim 10 wherein said call, absent operation of said apparatus for at least partially isolating, results in data being returned by the second component to the first component, and wherein said apparatus for at least partially isolating is operative, instead, to inject fake data into the first component.

12. A system according to claim 10 wherein said apparatus for at least partially isolating is operative to fake a failure of the second component.

13. A system according to claim 1 wherein said access controlling code is controlled by an application-specific test protocol.

14. A system according to claim 1 wherein said apparatus for at least partially isolating is operative, upon occurrence of a call by a first component from among the plurality of software components to a second component from among the plurality of software components, the second component operating upon at least one argument, to intervene by providing the second component with at least one fake argument.

15. A system according to claim 1 wherein at least one utilized software component comprises initialization code and wherein said apparatus for testing is operative to record instances of at least partial isolation of said initialization code and, if said utilized software component is called subsequent to termination of said at least partial isolation of the initialization code, to artificially execute said initialization code.

16. A system according to claim 13 wherein said access controlling code is controlled by the protocol via the apparatus for testing.

17. A system according to claim 1 wherein said apparatus for testing is operative to select at least one software component for said apparatus for at least partially isolating to at least partially isolate from within the software application.

18. A system according to claim 1 wherein said apparatus for testing is operative to generate a plurality of expectations each of which comprises an identity of an individual component from among the plurality of software components and an associated behavior inducing message inducing said apparatus for at least partially isolating, when said individual component is called, to selectively at least partially isolate, and to impose a fake behavior upon, the individual component.

19. A system according to claim 18 wherein the fake behavior imposed upon the individual component, when called, in accordance with contents of the associated behavior inducing message, comprises one of the following: preventing the called component from running and, if results are to be returned, returning fake results; faking a failure of the called component; providing a fake argument to the called component; and none of the above.

20. A system according to claim 18 and also comprising access controlling code, weaved into at least one location in said software application, which is operative to query said apparatus for testing as to which operation, if any, said apparatus for at least partially isolating is to perform, to receive an expectation, responsively, from the apparatus for testing, and to activate said apparatus for at least partially isolating accordingly.

21. A system according to claim 18 wherein at least one of said expectations also comprises an indication of circumstances under which said individual component is to act upon said behavior inducing message.

22. A system according to claim 18 wherein at least an individual one of said expectations also comprises an indication of at least one expected arguments which are expected to be passed to said individual component.

23. A system according to claim 18 wherein said identity of an individual component comprises a string identifying the component and stored within the expectation.

24. A system according to claim 18 wherein at least one expectation is generating by recording an actual call to at least said individual component.

25. A system according to claim 22 wherein said individual expectation is generating by recording an actual call to said individual component, in the course of which call at least one actual argument is actually passed to said individual component, and wherein the indication of at least one argument in said expectation comprises said at least one actual argument.

26. A system according to claim 1 wherein the plurality of software components comprises a set of at least one pairs of utilizing-utilized software components each including a utilized software component and a utilizing software component which utilizes said utilized software component and which includes metadata pointing to the utilized software component, and said apparatus for at least partially isolating comprises apparatus for modifying said metadata to point to access control code, said access controlling code being operative to control access of the utilizing software component to the utilized software component.

27. A system according to claim 10 wherein the second component has yet to be created.

28. A system according to claim 24 wherein said call comprises a chain of n calls and wherein n expectations are generated by recording said chain of n calls.

29. A system according to claim 22 wherein said apparatus for testing is operative, when said individual component is called with at least one actual arguments, to test said actual arguments in comparison to said expected arguments.

30. A software testing system operative to test a software application comprising a plurality of software components, at least some of which are coupled, each software component operative to perform a function the system comprising:
   a processor and memory:
   computational apparatus for at least partially isolating, from within the software application, at least one coupled software component which performs a given function by introducing, prior to execution, code elements for runtime access and control of application points associated with the at least one coupled software component; and
   computational apparatus for testing the software application by removing or replacing a behavior of at least said at least partially isolated coupled software component during runtime, without dependency injection, wherein said apparatus for testing is operative to generate a plurality of expectations each of which comprises an identity of an individual component from among the plurality of software components and an associated behavior inducing message inducing said apparatus for at least partially isolating, when said individual component is called, to selectively at least partially isolate, and to impose a fake behavior upon, the individual component.

31. A system according to claim 30 wherein said coupled software component is operative to call at least one additional software component and wherein said apparatus for testing is operative to test whether said at least partially isolated coupled software component calls said at least one additional software component correctly.

32. A system according to claim 30 wherein the plurality of software components comprises a set of at least one pairs of utilizing-utilized software components each including a utilized software component and a utilizing software component which utilizes said utilized software component, said apparatus for at least partially isolating comprises apparatus for adding access controlling code between each pair of utilizing-utilized software components, said access controlling code being operative to control access of the utilizing software component to the utilized software component.

33. A system according to claim 32 wherein said set comprises at least one utilizing software component which calls its corresponding utilized software component.

34. A system according to claim 32 wherein said set comprises at least one utilizing software component which accesses at least one data element belonging to its corresponding utilized software component.

35. A system according to claim 32 wherein said utilizing software component comprises test code and wherein said access controlling code is operative to generate a plurality of testing scenarios for said test code by suitably controlling access of the test code to the utilized software component.

36. A system according to claim 32 wherein the software application comprises at least one source file and wherein said apparatus for adding code is operative, before compilation of the software application, to add the access controlling code to the at least one source file thereby to provide, upon compilation of the source file, an at least partially isolatable weaved application.

37. A system according to claim 32 wherein the software application is stored in at least one executable file and wherein said apparatus for adding code comprises apparatus for parsing said at least one executable file, adding said access controlling code to the parsed executable file, and saving, thereby to provide an at least partially isolatable weaved executable file.

38. A system according to claim 32 wherein said apparatus for adding code is operative, after the software application has been loaded into directly accessible memory by an operating system from an executable file on disk and before the software application has been run, to parse the software application and add said access controlling code to the parsed software application, thereby to provide an at least partially isolatable weaved application.

39. A system according to claim 30 wherein the plurality of software components comprises a set of at least one pairs of utilizing utilized software components each including a utilized software component and a utilizing software component which utilizes said utilized software component, and wherein said apparatus for at least partially isolating comprises access controlling code external of the software application for anticipating forthcoming utilization of utilized software components by utilizing software components and for selectively preventing said utilization by controlling access of the utilizing software component to the utilized software component.

40. A system according to claim 30 wherein said apparatus for at least partially isolating is operative, upon occurrence of a call by a first component from among the plurality of software components to a second component from among the plurality of software components, to intervene to ensure that the second component does not run.

41. A system according to claim 40 wherein said call, absent operation of said apparatus for at least partially isolating, results in data being returned by the second component to the first component, and wherein said apparatus for at least partially isolating is operative, instead, to inject fake data into the first component.

42. A system according to claim 40 wherein said apparatus for at least partially isolating is operative to fake a failure of the second component.

43. A system according to claim 32 wherein said access controlling code is controlled by an application-specific test protocol.

44. A system according to claim 30 wherein said apparatus for at least partially isolating is operative, upon occurrence of a call by a first component from among the plurality of software components to a second component from among the plurality of software components, the second component operating upon at least one argument, to intervene by providing the second component with at least one fake argument.

45. A system according to claim 32 wherein at least one utilized software component comprises initialization code and wherein said apparatus for testing is operative to record instances of at least partial isolation of said initialization code and, if said utilized software component is called subsequent to termination of said at least partial isolation of the initialization code, to artificially execute said initialization code.

46. A system according to claim 43 wherein said access controlling code is controlled by the protocol via the apparatus for testing.

47. A system according to claim 30 wherein said apparatus for testing is operative to select at least one software component for said apparatus for at least partially isolating to at least partially isolate from within the software application.

48. A system according to claim 30 wherein the plurality of software components comprises a set of at least one pairs of utilizing utilized software components each including a utilized software component and a utilizing software component which utilizes said utilized software component and which includes metadata pointing to the utilized software component, and said apparatus for at least partially isolating comprises apparatus for modifying said meta-data to point to access control code, said access controlling code being operative to control access of the utilizing software component to the utilized software component.

49. A system according to claim 40 wherein the second component has yet to be created.

50. A software testing method operative to test a software application comprising a plurality of software components, at least some of which are coupled, each software component operative to perform a function, the method comprising:
at least partially isolating, from within the software application, at least one coupled software component which performs a given function by introducing, prior to execution, code elements for runtime access of application points associated with the at least one coupled software component, such that at least one code element associated with the at least one coupled software component provides access control between utilizing-utilized software components; and
testing using a computational apparatus at least said at least partially isolated coupled software component by imposing a fake behavior on the at least one coupled software component, wherein imposing includes removing or replacing a behavior of the at least one coupled software component during runtime: and
wherein the at least one code element is operative to query said computational apparatus for testing.

51. A system according to claim 50, said isolating comprising at least partially isolating, from within the software application, at least one coupled software component which performs a given function, without utilizing built-in byte-code modification functionality, said testing comprising testing logic of at least said at least partially isolated coupled software component, without dependency injection.

52. A method according to claim 50 wherein said testing is operative to generate a plurality of expectations each of which comprises an identity of an individual component from among the plurality of software components and an associated behavior inducing message operative, when said individual component is called, to induce an operation of selectively at least partially isolating, and imposing a fake behavior upon, the individual component.

* * * * *